May 20, 1930. W. C. STEVENS 1,759,668
APPARATUS FOR MAKING MULTIPLE PLY FABRICS
Filed Dec. 11, 1922 4 Sheets-Sheet 1
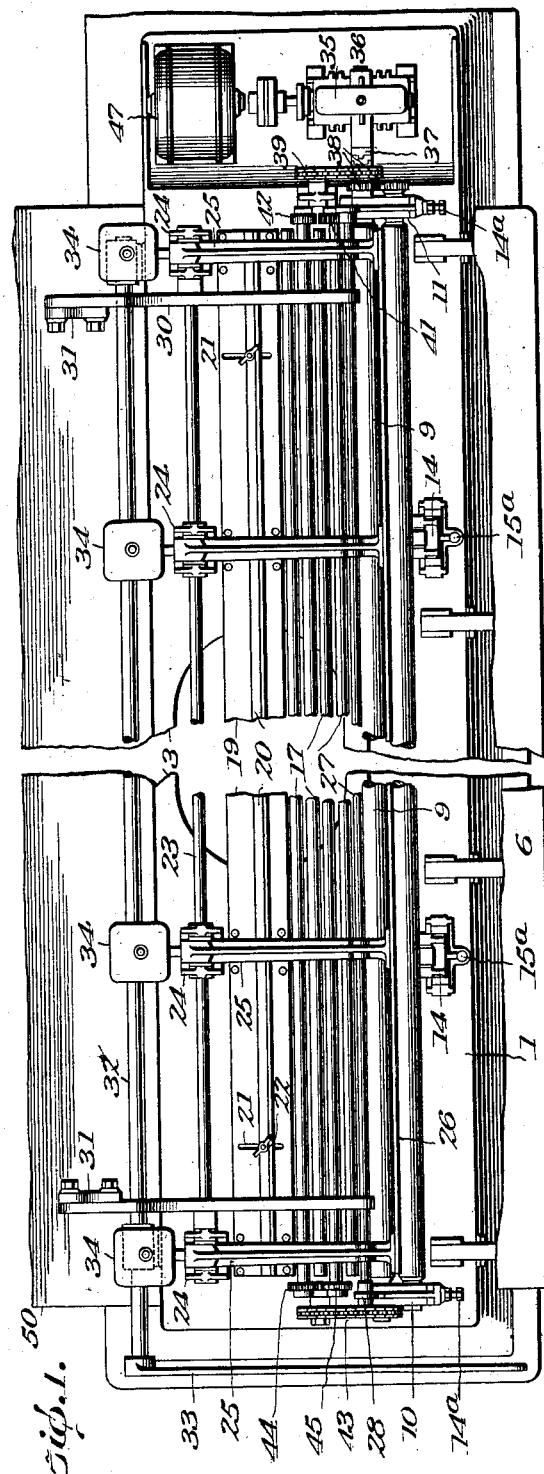
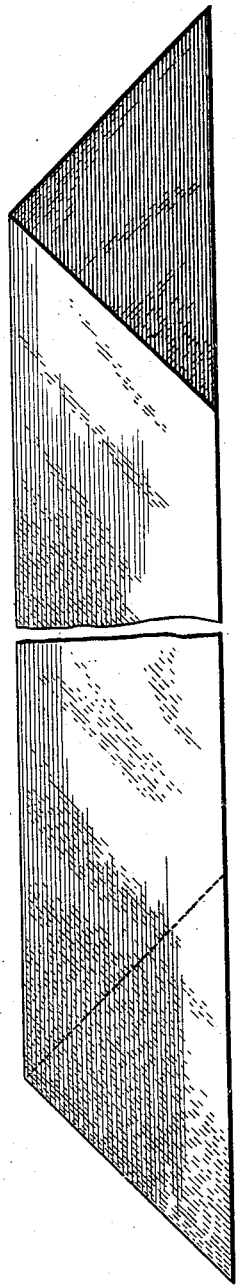
Inventor
William C. Stevens
By
Attorney May 20, 1930. W. C. STEVENS 1,759,668
APPARATUS FOR MAKING MULTIPLE PLY FABRICS
Filed Dec. 11, 1922 4 Sheets-Sheet 2

Inventor
William C. Stevens
By
Attorney

May 20, 1930. W. C. STEVENS 1,759,668
APPARATUS FOR MAKING MULTIPLE PLY FABRICS
Filed Dec. 11, 1922 4 Sheets-Sheet 3
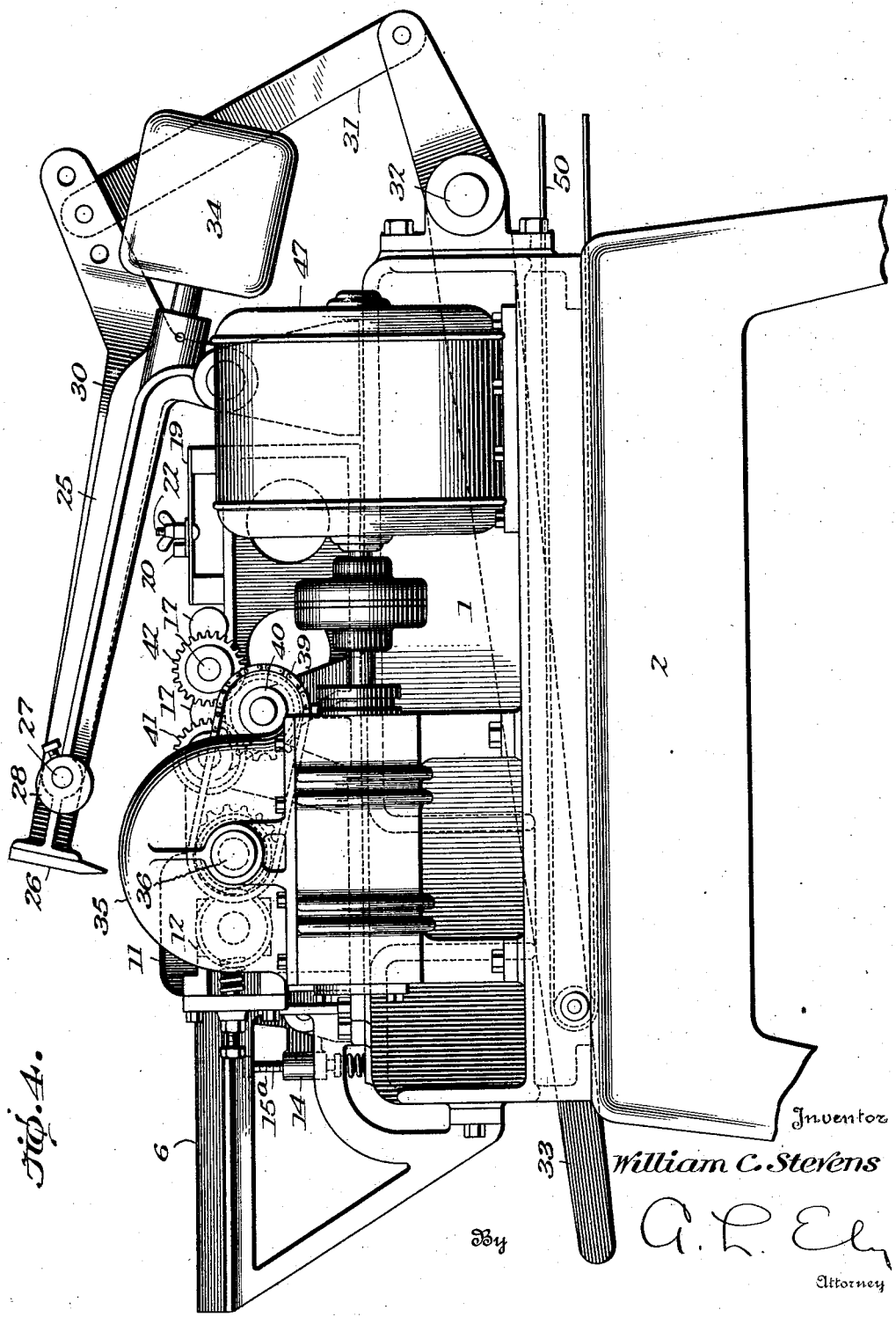
Inventor
William C. Stevens
By G. L. Ely
Attorney

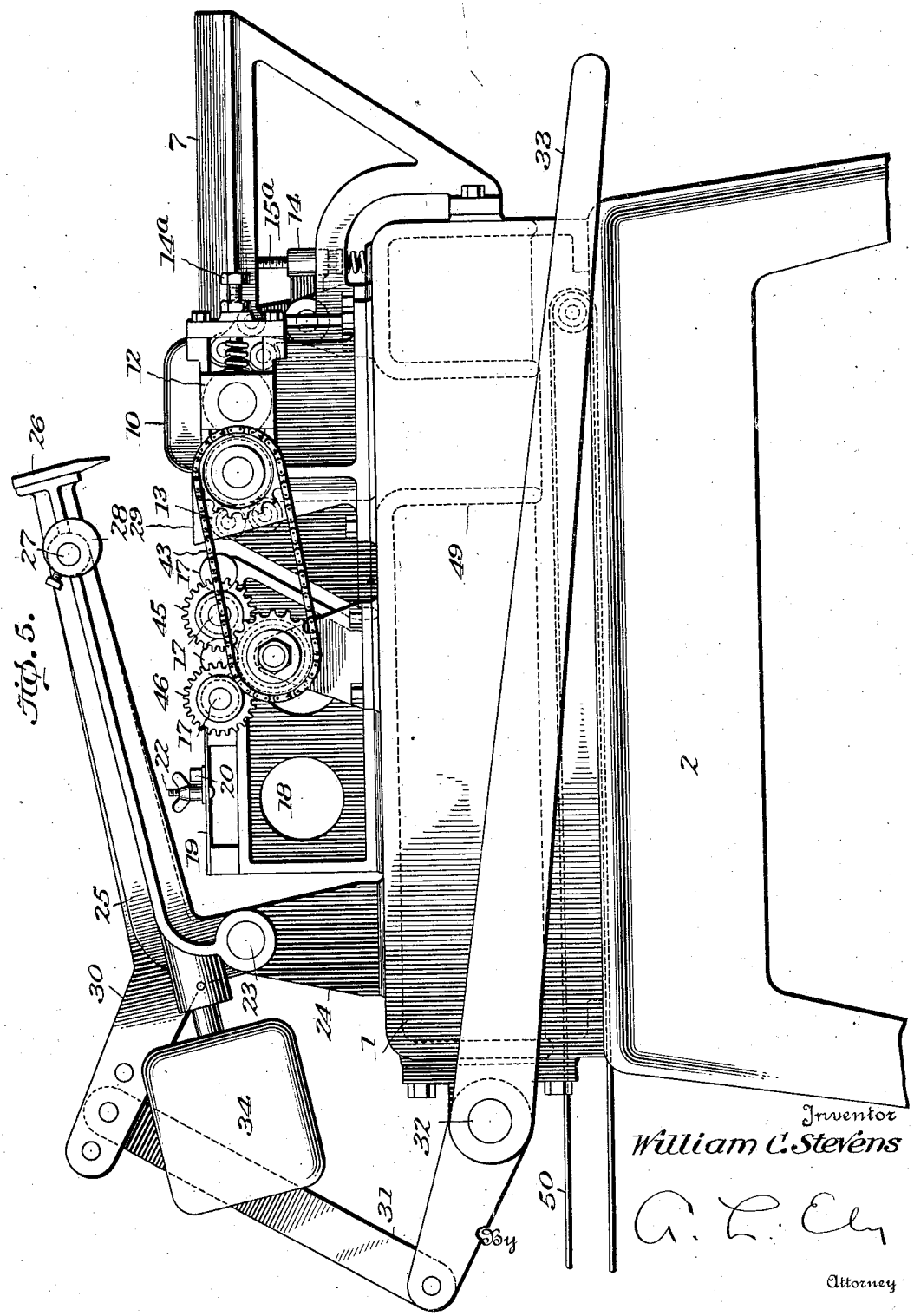

Patented May 20, 1930

1,759,668

UNITED STATES PATENT OFFICE

WILLIAM C. STEVENS, OF AKRON, OHIO, ASSIGNOR TO THE FIRESTONE TIRE AND RUBBER COMPANY, OF AKRON, OHIO, A CORPORATION OF OHIO

APPARATUS FOR MAKING MULTIPLE-PLY FABRICS

Application filed December 11, 1922. Serial No. 606,018.

My invention relates, broadly, to apparatus for use in making a multiple ply fabric, and it is concerned particularly with apparatus for forming a two ply strip for use in building pneumatic tires.

In building tire carcasses, it has been found a particularly advantageous procedure to combine two, or possibly more, bias cut widths of cord fabric into a single strip of more than one ply, with the cords of one ply crossing those of another ply, in which relation they are held by the tacky nature of the fabric. These multiple ply strips are subsequently stitched upon one another in the usual manner to form the tire carcass. This procedure, it will be seen, materially decreases the number of stitching operations required under the old method. It also prevents distortion of the cords of each ply under the pressure of the stitchers and such distortion frequently occurs when single plies are stitched together. Because of the foregoing advantages arising from the use of multiple ply strips, a better tire can be produced in an appreciably shorter time.

I have designed an apparatus for quickly producing a multiple ply strip from a single strip of tire fabric by folding a width of the fabric to form two or more plies and compacting the plies thus formed to cause them to adhere together, thus displacing former methods of plying up the fabric.

The particular purpose of my invention is to provide an apparatus for folding a strip and pressing the folded portions together with a uniform pressure throughout all areas of the strip.

An equally important object is to crease and fold the strip with its edges exactly aligned so that the cords in one ply will cross the cores of the other ply uniformly throughout the strip.

Another purpose of my invention is to provide an apparatus for folding different widths of fabric strips at their exact centers so that a two ply strip is formed and the edges of the plies are parallel.

My invention also comprehends an apparatus for folding a strip so that it will hang pendent and be prevented from wrinkling as the compacting operation progresses.

Still another purpose of my invention is to provide in an apparatus of this character, means for receiving and conveying the strip away from the apparatus in a flat and unwrinkled condition.

Other purposes and advantages comprehended by my invention will appear when the following description is read and upon reference to the accompanying drawings, in which:

Figure 1 is a top plan view, partly broken out, of a preferred embodiment of my invention;

Figure 2 is a view illustrating a two ply strip of cord fabric formed through the practice of my invention;

Figure 4 is an elevational view of one end of my invention; and

Figure 5 is a similar view of the other end of my invention.

Figure 3:
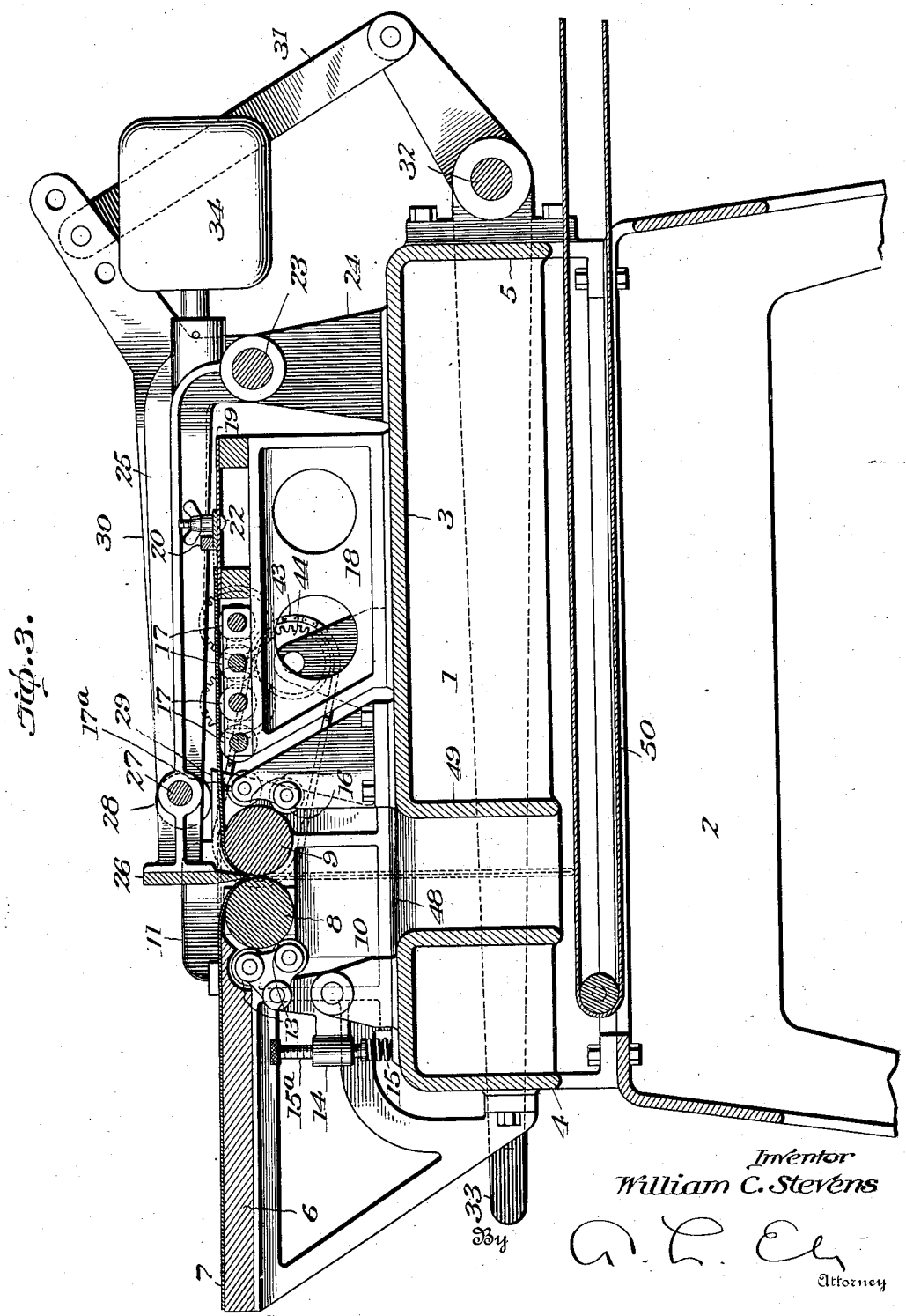
Figure 3 is a transverse sectional view through Figure 1, taken on the line 3—3 and drawn on an enlarged scale.

In the present embodiment of my invention, as illustrated in the drawings, I provide a hollow inverted casing 1 which is supported upon any suitable form of base member 2. The casing 1 is formed with a horizontal top portion 3 and vertical front and rear walls 4 and 5 respectively. Upon the front wall 4 of the casing 1, a horizontal table 6 is affixed in elevated position over which an operator may feed a strip of fabric 7 in the direction of its width to position the longitudinal center of the strip over a pair of driven folding and pressing rollers 8 and 9. The rollers 8 and 9 are disposed in side by side relation slightly below the top surface of the table 6 and parallel with the rear edge thereof. Suitable journal brackets 10 and 11 arising from the portion 3 of the casing 1 support the ends of the rollers 8 and 9. One roller, preferably the forward one 8, is movable laterally of the other roller, and has its ends mounted in spring pressed slide blocks 12 whereby it is held at its ends in yielding engagement with the other roller 9. At suitable points, intermediate its ends, the roller 8 is engaged by roller bearings 13 which are carried by pivoted brackets 14. The brackets 14 are actuated by suitably arranged springs 15 to force the roller 8 against the roller 9 at points intermediate its length. By means of the spring pressed bearings 13 and the slide blocks 12, the roller 8 is yieldingly held, with uniform pressure, throughout its length against the roller 9 and a uniform pressure is exerted against all areas of the strip during the folding and compacting operation, as will presently appear. If desired, adjusting screws 14ª and 15ª may be provided for use in conjunction with the blocks 12 and the bearings 13 respectively to adjust the pressure of the roller 8 against the roller 9. In order to hold the roller 9 in axial alignment, suitable roller bearings 16 are provided intermediate its length to bear against the rear side thereof.

In the rear of the rollers 8 and 9, a series of spaced apart parallel rollers 17, preferably four in number, are provided for a purpose presently explained. The rollers 17 are journaled to rotate parallel with the rollers 8 and 9 and are mounted upon suitable brackets 18 arising from the casing 1. The tops of the rollers 17 are level with the tops of the rollers 8 and 9 and also with the top of a second horizontal table 19 that is located in the rear of the last roller 17 of the series. A gage bar 20 is mounted upon the table 19 parallel with the rollers 8 and 9. The bar 20 is adjustable toward or away from the rollers 8 and 9 and for this purpose the table 19 is slotted, as at 21, to receive bolts 22 carried by the bar. At the rear of the table 19, a horizontal shaft 23 is journaled upon the casing 1 in suitable bearings 24 and parallel with the rollers 8, 9 and 17. The shaft 23 carries a series of vertically swinging arms 25 that project forwardly over the roller 9 and carry upon their forward ends a wedge shaped creasing bar 26 arranged to descend between the rollers 8 and 9. Adjacent the creasing bar 26, the arms 25 are connected by a fixed shaft 27 which carries an adjustable cam element 28 upon each end thereof. The cam elements 28 in the lowered position of the arms 25 engage abutments 29 upon the brackets 10 and 11 respectively. The function of the cams 28 and abutments 29 is to limit the distance that the creasing bar 26 passes between the rollers 8 and 9 and also to align the bar with said rollers in the event of wear. A pair of vertically swinging opperating levers 30 project forwardly from the shaft 23 at their forward ends support the shaft 27. The levers 30 are rocked toward the rollers 8 and 9 by means of link connections 31 connecting their rear ends with a rock shaft 32 upon the casing 1. A hand lever 33 serves to rock the shaft 32. Levers 30, together with arms 25, are normally held in raised position by counter- weights 34 upon the rear ends of the arms 25.

The rollers 8, 9 and 17 are rotated in the following manner. A speed reducing device 35 is arranged upon the casing 1 with its shaft 36 aligned with the roller 9 to which it is connected by a suitable form of clutch 37. The roller 9 is driven counter clockwise and is geared to the roller 8 at its driven end and as illustrated at 38, so that roller 8 is positively driven in a clockwise direction. A sprocket and chain connection 39 extends from one end of the roller 9 to a driving gear 40 at one end of the series of rollers 17. The driving gear 40 is arranged to mesh with gears 41 and 42 fixed respectively upon the first and third rollers 17 of the series, whereby said rollers 17 are driven clockwise by roller 9. A similar sprocket and chain connection 43 extends from the other end of the roller 9 to a driving gear 44 which meshes with gears 45 and 46 fixed respectively upon the ends of the second and fourth rollers 17. Thus all of the rollers 17 are driven clockwise by the roller 9 and the roller 8 is left free for movement toward or away from the roller 9. A suitable motor 47 is provided for driving the speed reducing device 35.

In operating my invention, I feed the strip of tire fabric 7 in the direction of its width from the table 6 over the rollers 8 and 9 and onto the rollers 17 until its rear edge abuts the gage bar 20 as shown in dotted lines in Fig. 3. Gage bar 20, it will be understood, is first set upon the table 19 so that the center of the strip, when it is flattened out, will be directly over the bight of the rollers 8 and 9. In this position of the strip, the rotating rollers 17 smooth or flatten out the portion of the strip 7 that passes thereover and hold one edge thereof against the bar 20. The rotating rollers 17 also serves to retard movement of one-half of the strip against the pull of the rollers 8 and 9 and thus prevent it from wrinkling or buckling prior to its passage between the latter rollers. Hand lever 33 is now moved to rock the shaft 32 and through the links 31 lower the arms 25 until the cams 28 on the shaft 27 engage the abutments 29. In this position of the arms 25, the creasing bar 26 has creased the strip 7 along its center line and tucked it into the bight of the rollers 8 and 9 sufficiently for them to grip its creased portion. The hand lever 33 is now released and the arms 25 will return to raised position, removing the creasing bar. The rotating rollers 8 and 9 will now feed the strip therebetween and compact or press the two half portions together into a two ply strip. During this operation, the roller 8 is pressed toward the roller 9 with a uniform pressure throughout its entire length so that the two half portions of the strip 7 are pressed together evenly and uniformly throughout their entire area. Wires 17ª may be provided between the forward roller 17 and the roller 9 to prevent the fabric sagging at this point.

I have designed the portion 3 of the casing 1 with an aperture 48 directly below the rollers 8 and 9 and a vertical partition 49 in the rear of and below the aperture. As the two ply strip is formed by the rollers 8 and 9, it hangs pendent therefrom directly over a conveyor belt 50. The conveyor belt may be driven in any suitable manner so that its upper run travels toward the rear of the machine at a faster speed than that at which the rollers 8 and 9 rotate.

Obviously as the folded edge of the strip engages the conveyor belt 50, it will be pulled beneath the partition 49 as the strip leaves the rollers 8 and 9. This feature serves to flatten out the strip as it is discharged upon the conveyor 50 and to prevent it from becoming wrinkled and injured.

The present disclosure deals principally with an apparatus for making two ply strips, but it will be seen that by a slight modification or re-arrangement of the part of the apparatus, the two ply strip may again be doubled and a four ply strip formed.

Other modifications are also within the spirit of my invention and it is to be understood that such as are within the scope of the appended claim are comprehended by the present disclosure.

What I claim is:

Apparatus of the character described comprising, in combination, cooperating folding and pressing rollers arranged to feed a strip of fabric therebetween in a downward direction, a vertical plate adjacent the path of movement of the strip, and a horizontal conveyor arranged to pull the lower edge of the strip against the plate before the other edge of the strip leaves said rollers.

WILLIAM C. STEVENS.